US006662221B1

(12) United States Patent
Gonda et al.

(10) Patent No.: US 6,662,221 B1
(45) Date of Patent: Dec. 9, 2003

(54) INTEGRATED NETWORK AND SERVICE MANAGEMENT WITH AUTOMATED FLOW THROUGH CONFIGURATION AND PROVISIONING OF VIRTUAL PRIVATE NETWORKS

(75) Inventors: Rohinton S. Gonda, Fuquay-Varina, NC (US); Nin Kin Shu, Somerset, NJ (US); Ramalingeswara R. Vangala, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/546,589

(22) Filed: Apr. 11, 2000

Related U.S. Application Data

(60) Provisional application No. 60/128,892, filed on Apr. 12, 1999.

(51) Int. Cl.[7] ...................... G06F 15/173; G06F 15/177
(52) U.S. Cl. ...................... 709/223; 709/203; 709/220; 709/221; 709/225; 709/227; 709/236; 709/242; 709/245; 370/254; 370/409
(58) Field of Search ................................ 709/200–203, 709/220–229, 236, 242, 245; 370/254, 396–401, 409; 713/201; 701/10

(56) References Cited

U.S. PATENT DOCUMENTS

| | | | | |
|---|---|---|---|---|
| 5,504,921 A | * | 4/1996 | Dev et al. | 709/223 |
| 5,752,003 A | * | 5/1998 | Hart | 709/223 |
| 5,802,286 A | * | 9/1998 | Dere et al. | 709/220 |
| 6,061,721 A | * | 5/2000 | Ismael et al. | 709/223 |
| 6,069,894 A | * | 5/2000 | Holender, deceased et al. | 370/409 |
| 6,079,020 A | * | 6/2000 | Liu | 709/223 |
| 6,085,238 A | * | 7/2000 | Yuasa et al. | 709/223 |
| 6,212,559 B1 | * | 4/2001 | Bixler et al. | 709/221 |
| 6,502,135 B1 | * | 12/2002 | Munger et al. | 709/225 |
| 6,577,327 B1 | * | 6/2003 | Rochford et al. | 709/223 |

OTHER PUBLICATIONS

Red Creek Communications, Inc., Product Literature, 43 pages, May 1997.
Bridgewater, Product Literature, 54 pages, 1997–1998.
TimeStep, Inc., Product Literature, 102 pages, Oct. 1997.
VPNet Technologies, Inc., Product Literature, 64 pages, Aug. 1997.

* cited by examiner

*Primary Examiner*—Bharat Barot

(57) ABSTRACT

In one aspect of the invention, an automated system for managing a virtual private network comprises one or more processing devices operative to: (i) generate a service order based on a request from a user for at least one of a new service, a modification of an existing service and a termination of an existing service associated with the virtual private network; (ii) cause a determination of design requirements associated with implementing the user's request; (iii) cause provisioning of one or more virtual private network elements, when necessary, to implement the design requirements; (iv) cause the virtual private network to be configured to satisfy one or more conditions associated with the user's request; and (v) cause at least a portion of the virtual private network to be tested to determine whether the user's request has been satisfied; and a memory, coupled to the one or more processing devices, which stores at least a portion of data associated with the generating, design, provisioning, configuration and testing operations.

28 Claims, 14 Drawing Sheets

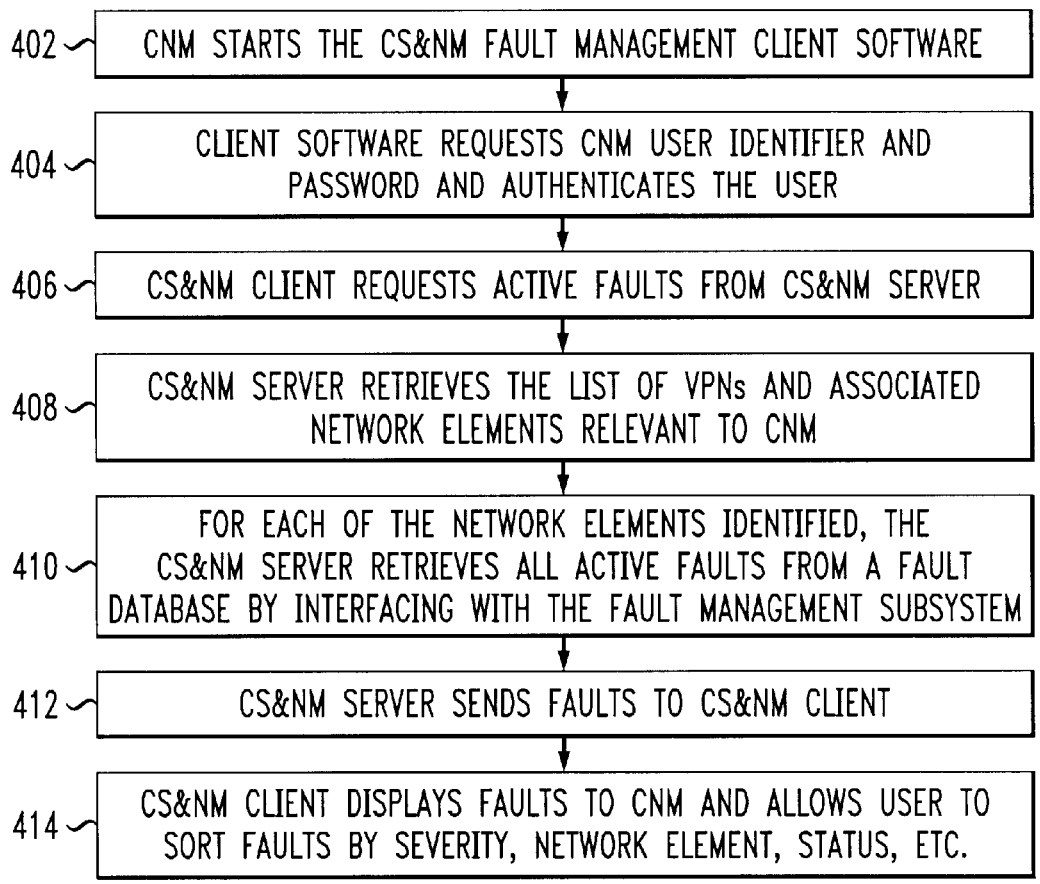

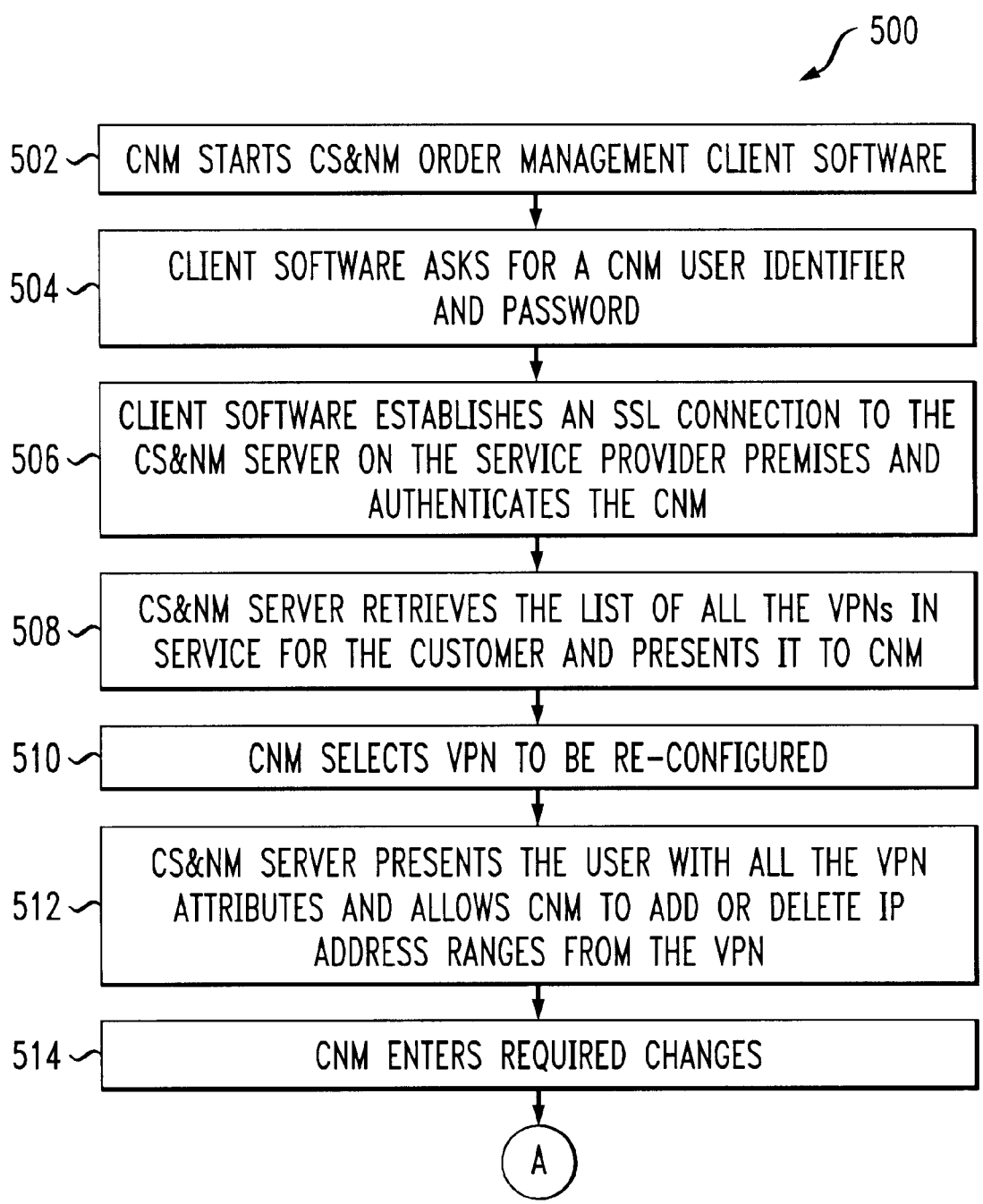

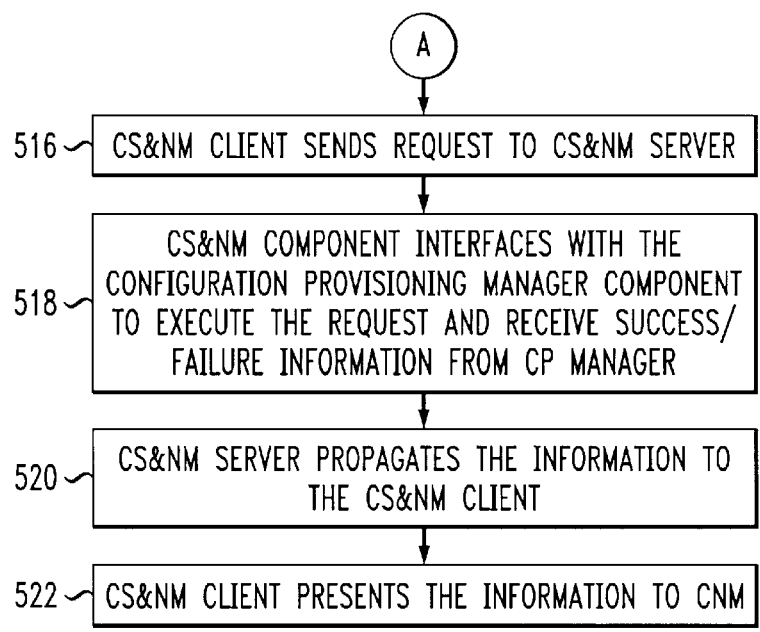
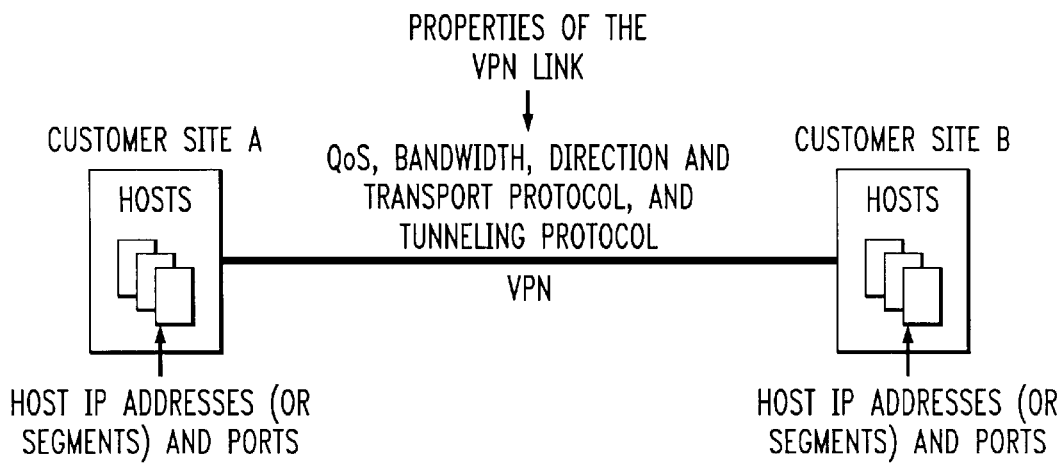

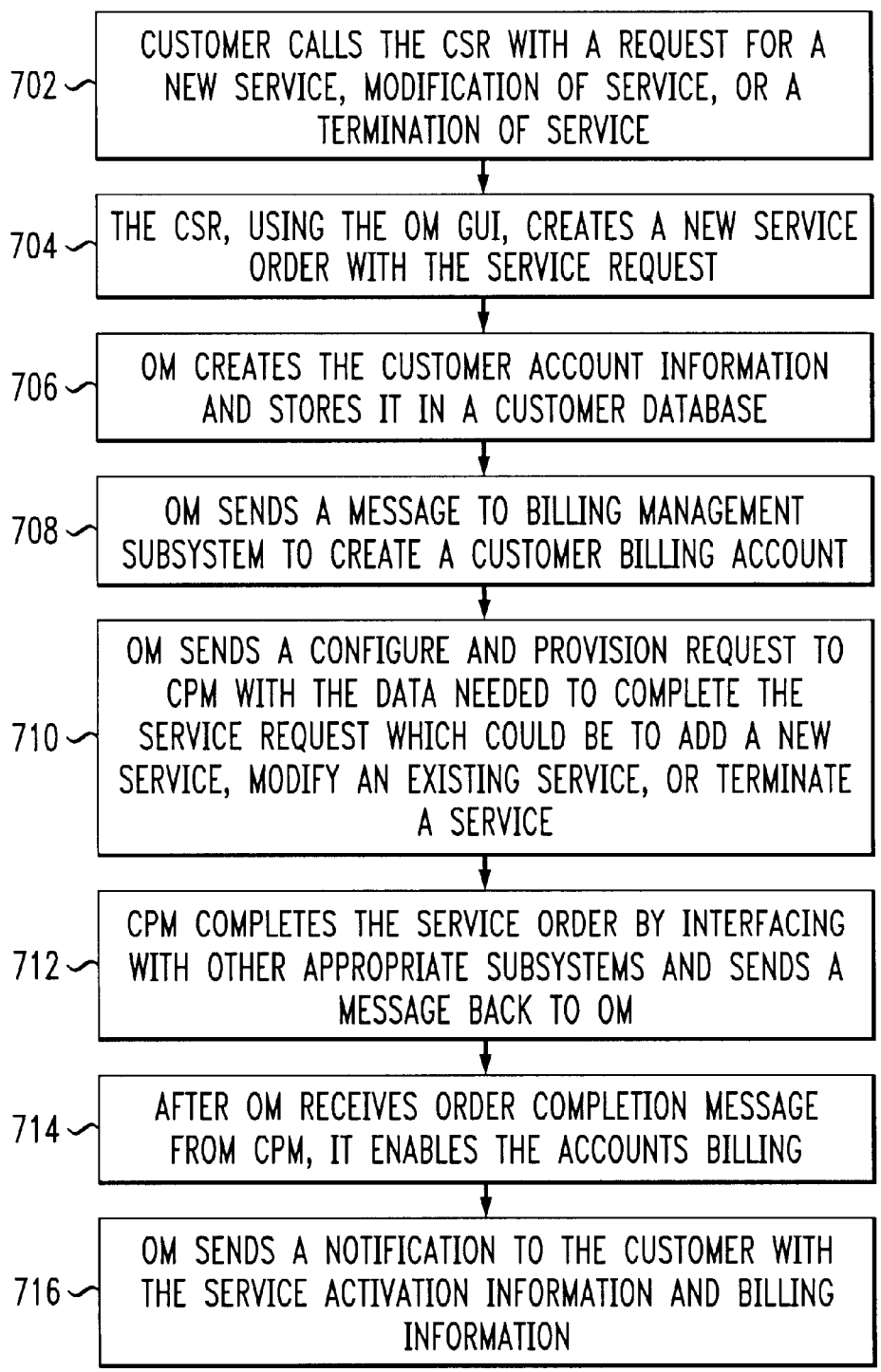

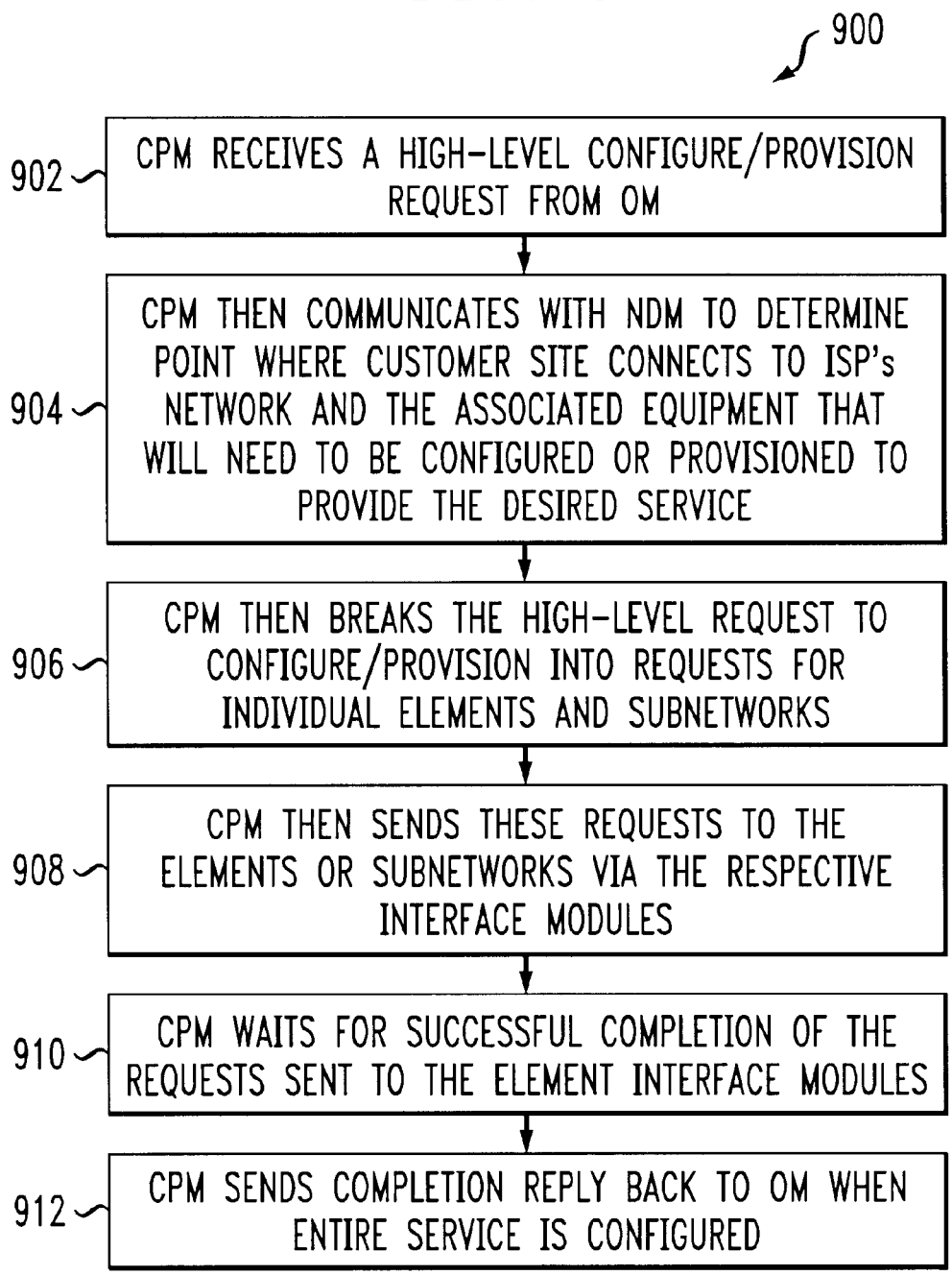

INTEGRATED NETWORK AND SERVICE MANAGEMENT WITH AUTOMATED FLOW THROUGH CONFIGURATION AND PROVISIONING OF VIRTUAL PRIVATE NETWORKS

CROSS REFERENCE TO RELATED APPLICATIONS

The present application claims priority to the U.S. provisional patent application identified by Ser. No. 60/128,892 filed on Apr. 12, 1999, the disclosure of which is incorporated by reference herein.

FIELD OF THE INVENTION

The invention relates to configuration management of communications networks and, more particularly, to methods and apparatus for providing automated configuration management of one or more virtual private networks.

BACKGROUND OF THE INVENTION

A virtual private network (VPN) is a communication network that provides customers connectivity over a shared infrastructure and emulates the characteristics of a private network. For example, the shared infrastructure may be the public Internet or even a private shared network. To provide a VPN, a tunneling protocol may be used. Generally, a tunneling protocol enables the creation of a private data stream via a public network by placing one packet inside of another. In the context of a VPN, an IP (Internet Protocol) packet is placed inside another IP packet. Tunneling provides for minimal or no impact on private addressing or internal protocols. VPNs may also provide security features such as, for example, authentication, encryption and certificates, etc. They may also provide service-level assurances relating to, for example, reliability, bandwidth, delay, jitter, etc. Examples of IP VPNs arrangements include: (i) connecting local area networks (LANs) via a Local Exchange Carrier's (LEC's) network, an Internet Service Provider's (ISP) network or via the public Internet; or (ii) using an ISP dial-in service to a local Point of Presence (POP) and then connecting to the intranet.

The overall task of the management of a communication network, such as a VPN, can be thought of as including three functionally distinct management areas: (i) fault management; (ii) performance management; and (iii) configuration management. The names of each management area provide a succinct explanation of the aspect of the network with which they are concerned. Fault management deals with methodologies for handling (e.g., detecting and correcting) failures in the network. Performance management deals with methodologies for monitoring and ensuring particular levels of performance (e.g., Quality of Service or QoS) in the network. Configuration management deals with methodologies for designing, provisioning (e.g., installing the necessary network hardware components), configuring (e.g., providing necessary bandwidth, QoS and security features) and testing of a new network or modifications to an existing network. It is this latter area of network management to which the present invention is directed.

Typically, network service providers such as network backbone owners, ISPs and LECs, involved with providing and/or maintaining communication networks or portions thereof, have relied on manual configuration management techniques to perform these tasks. That is, an actual person such as a network administrator communicates with a customer and then is involved in some way with the tasks of designing, provisioning, configuring and testing a network or portions thereof, in response to customer needs. However, depending on the complexity of the network, the various configuration management tasks can prove to be daunting when manually performed. Also, errors on the part of the network administrator in performing configuration management tasks are known to cause significant problems in terms of faulty network routing or downtime. These problems can create serious customer dissatisfaction to the extent that they would request reimbursements or penalties or change to another network provider.

There have been attempts to remove, or at least minimize, the manual nature of some of the configuration management tasks that are otherwise performed by a network administrator. Examples of such attempts include limited systems available from such companies as VPNet of California, Red Creek of California and New Oak of Massachusetts. However, none of the systems available from these and other similar companies provide network-level configuration management solutions. That is, they do not handle all configuration management tasks associated with a complete network. Also, none of the available systems are vendor-independent. That is, they do not handle configuration management tasks associated with components from different vendors. Typically, they can only handle one vendor's components. Lastly, while such systems provide some limited degree of automation, none of them provide a fully automated flow-through configuration management system that includes interfaces to order management and/or billing.

Accordingly, there is a need for methods and apparatus for providing configuration management in association with a network, such as a VPN, which provide network-level solutions, are vendor-independent, provide full flow-through automation, and otherwise overcome limitations with the existing art not expressly mentioned above.

SUMMARY OF THE INVENTION

The present invention provides methods and apparatus for providing configuration management for a VPN, which provide network-level solutions, are vendor-independent, provide full flow-through automation, and otherwise overcome limitations with the existing art not expressly mentioned above.

In one aspect of the invention, an automated system for managing a virtual private network comprises one or more processing devices operative to: (i) generate a service order based on a request from a user for at least one of a new service, a modification of an existing service and a termination of an existing service associated with the virtual private network; (ii) cause a determination of design requirements associated with implementing the user's request; (iii) cause provisioning of one or more virtual private network elements, when necessary, to implement the design requirements; (iv) cause the virtual private network to be configured to satisfy one or more conditions associated with the user's request; and (v) cause at least a portion of the virtual private network to be tested to determine whether the user's request has been satisfied; and a memory, coupled to the one or more processing devices, which stores at least a portion of data associated with the generating, design, provisioning, configuration and testing operations.

In a client/server embodiment, at least one of the processing devices is a client device and at least one processing device is a server, the client device and the server being coupled via a communications network. Further, the client device is preferably resident at a location associated with the user and the server is resident at a location associated with a provider of the virtual private network.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating an example scenario of the fault management operation of a customer and service network management subsystem according to an embodiment of the present invention;

FIGS. 5A and 5B are a flow diagram illustrating an example scenario of the configuration management operation of a customer and service network management subsystem according to an embodiment of the present invention;

FIG. 6 is a diagram illustrating a VPN link;

FIG. 7 is a flow diagram illustrating an example scenario of the operation of an order management subsystem according to an embodiment of the present invention;

FIG. 9 is a flow diagram illustrating an example scenario of the operation of a configuration provisioning management subsystem according to an embodiment of the present invention.

DETAILED DESCRIPTION OF PREFERRED EMBODIMENTS

The present invention will be explained below in the context of an illustrative system architecture and framework for supporting IP service and network management in an IP VPN. Particularly, the configuration management methodologies of the invention will be explained in the context of this architecture and framework. However, it is to be appreciated that the invention is not limited to any particular VPN architecture and is more generally applicable to any VPN architecture wherein network-level management, vendor-independence, and/or full flow-through automation of configuration management tasks are desirable.

One main motivating factor for the IP Service and Network Management system of the invention is to provide service providers (e.g., backbone owners, ISPs, LECs, etc.) with an integrated set of management systems to automate their business and operations processes. Some of the benefits that customers who utilize the system realize may include: (i) increased ability to manage growth and change in their network (via automated "flow through" operations, improved interoperability and integration of multi-vendor networks, etc.); (ii) increased ability to maintain customer satisfaction (via measurable QoS agreements, improved visibility of the network, etc.); and (iii) increased profitability (via cost reductions from improved operations, increased revenues from advanced services, etc.). However, these are merely examples of such benefits and one of ordinary skill in the art will realize many other benefits that flow from the teachings of the invention.

Figure 1:
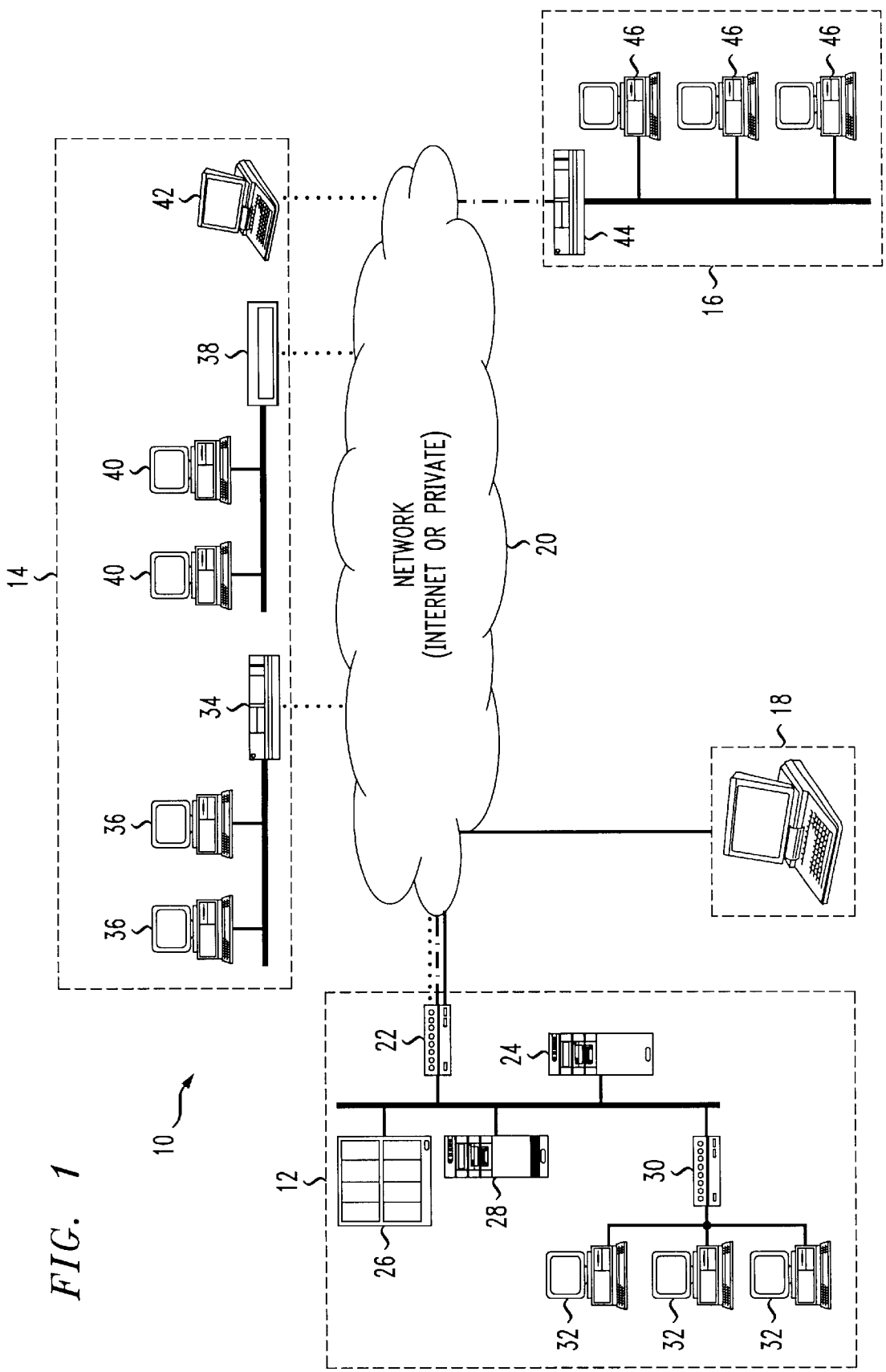
FIG. 1 is a block diagram illustrating an exemplary VPN architecture.

Referring initially to FIG. 1, an illustrative VPN network architecture 10 is shown. The network architecture shown in FIG. 1 depicts, in one drawing, a variety of different types of VPNs with which the management methodologies of the present invention may be employed. In particular, three different VPN scenarios are shown in FIG. 1. First, the central point of the VPN is a corporate center 12. This is the portion of the network that users seek access. The corporate center may include a managed firewall 22, a network security server 24, one or more other computers systems 26 and 28, and a second managed firewall 30 which serves various computers 32 connected via an Intranet within the corporate center. In an Extranet scenario, various business partners 14 are connected to the corporate center 12 via a service provider and/or public data network 20. This is denoted by the dotted line network connections in FIG. 1. The Extranet scenario may include a router 34 connecting various computers 36 to the corporate center 12 via the network 20. Similarly, a gateway 38 may connect various computers 40 to the corporate center 12 via the network 20. Further, one or more personal computer clients 42 may be connected to the corporate center 12 via the network 20. In a LAN-LAN scenario, a branch office 16 is connected to the corporate center 12 via the network 20. This is denoted by the dashed/dotted line network connections in FIG. 1. The LAN-LAN scenario may include a router 44 connecting various local area connected-computers 46 to the corporate center 12 via the network 20. In a Remote Access scenario, various computers 18 may be connected to the corporate center 12 using dial up modems and via the network 20. This is denoted by the solid line network connection in FIG. 1. In each scenario, the connection to the corporate center 12 is accomplished via VPN tunnels. That is, the data traversing along these network connections is encrypted in accordance with a tunneling protocol. Authentication of the tunnel endpoints may also be performed during the initialization of the tunnel. Further, it is to be appreciated that the network 20 may be the public Internet or a private network.

Given such possible connectivity and components associated with an IP VPN, such as illustrated in FIG. 1, it is to be understood that the present invention is directed to an IP service and network management system for use in creating, modifying and/or maintaining such a network given customer specifications. Such an illustrative management system will now be explained.

Figure 2:
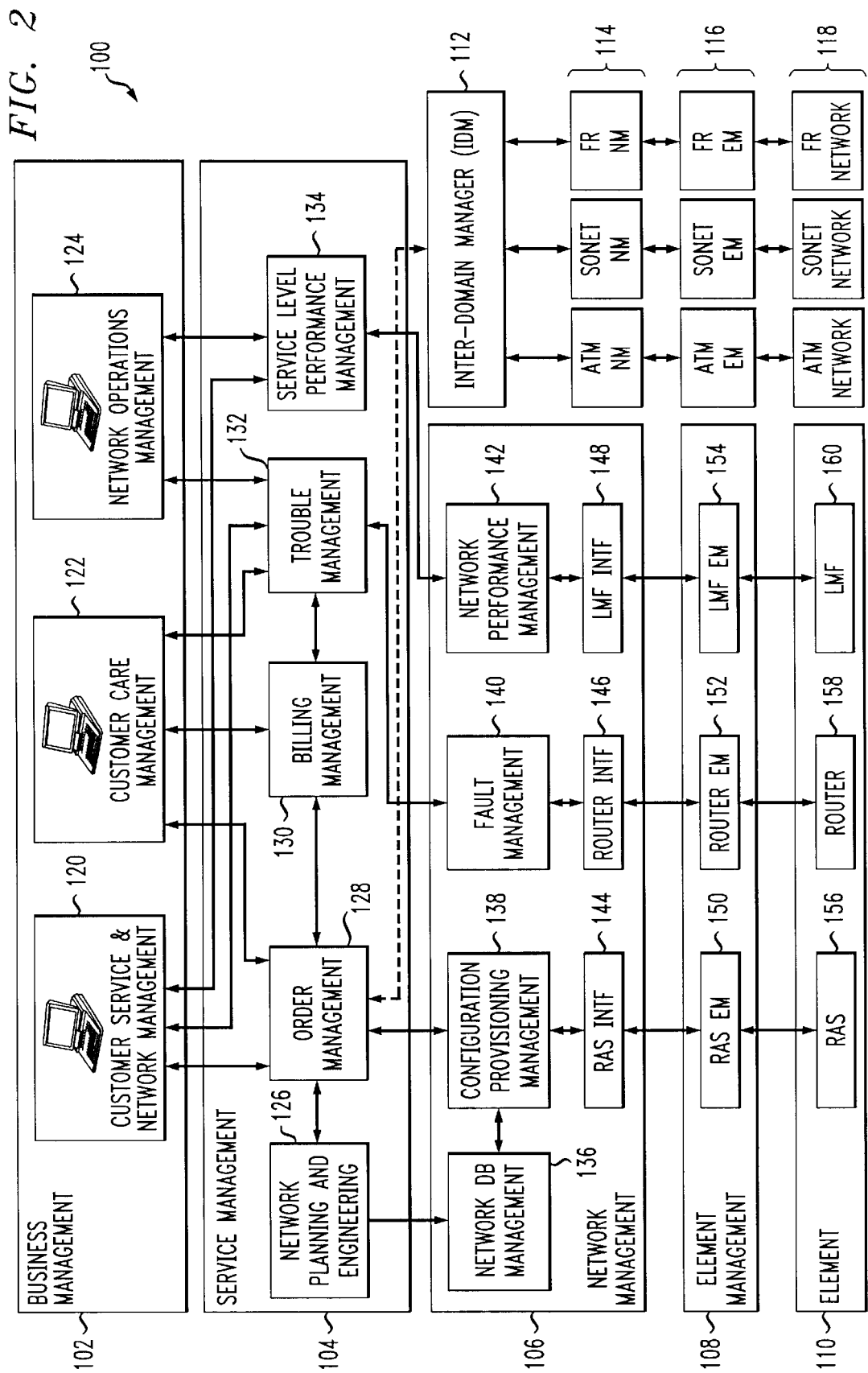
FIG. 2 is a block diagram illustrating an IP VPN management system architecture according to an embodiment of the present invention.

Referring now to FIG. 2, an illustrative IP VPN management system architecture according to the present invention is shown. It is to be understood that while the present invention is primarily directed toward configuration management, the overall architecture also illustrates other functional aspects of the overall management system, e.g., a fault management subsystem and a network performance subsystem. These subsystems generally perform the functions mentioned above and are shown for the purpose of explaining possible interaction they may have with the configuration management subsystem. The overall management system comprises a business management module 102, a service management module 104, a network management module 106, an element management module 108, elements 110, and an inter-domain manager 112 which may manage such other networks 118, outside of the VPN, such as an ATM network, a SONET network and a Frame Relay (FR) network, via respective network management modules 114 and respective element modules 116.

The business management module 102 comprises a customer service and network management subsystem 120, a customer care management subsystem 122 and a network operations management subsystem 124. The service management module 104 comprises a network planning and engineering subsystem 126, an order management subsystem 128, a billing management subsystem 130, a trouble management subsystem 132 and a service level performance management subsystem 134. The network management module 106 comprises a network database management subsystem 136, a configuration provisioning management subsystem 138, a fault management subsystem 140, a network performance management subsystem 142, a RAS (remote access server) interface 144, a router interface 146 and an LMF interface 148. LMF refers to a managed firewall system available from Lucent Technologies, Inc. of New Jersey, although any suitable firewall system may be used. The element management module 108 comprises a RAS element management module 150, a router element management module 152 and an LMF element management module 154. The elements 110 comprise a RAS 156, a router 158 and an LMF 160.

Given the functional architecture of the management system illustrated in FIG. 2, the operations of the various modules, subsystems and elements will be explained below. It is to be appreciated that while certain subsystems and/or elements are shown as being associated with a particular module or functional level of the system, their actual operations involve other subsystems and/or elements associated with other modules or levels. Thus, the below discussions of system operations include exemplary scenarios, which encompass subsystems and elements from various levels of the management system 100. Before discussing the system operations, an exemplary hardware architecture for implementing the network management system of the invention will first be explained.

Figure 3:
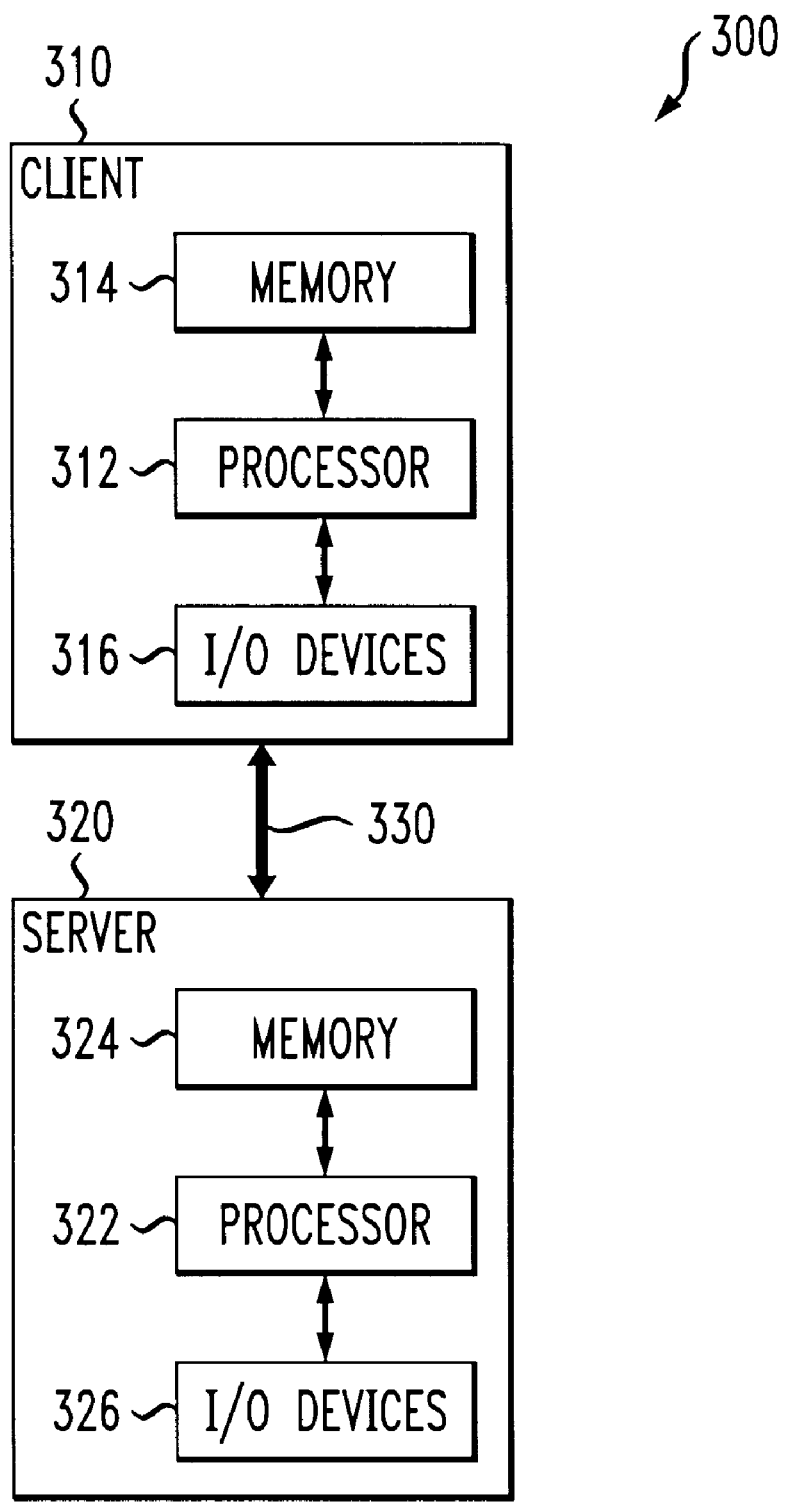
FIG. 3 is a block diagram illustrating an exemplary embodiment of a client/server computer system arrangement for implementing the management system of the invention.

Referring now to FIG. 3, a client/server computer system arrangement 300 for implementing the network management system of the invention is shown. Particularly, it is to be understood that, in the client/server arrangement, portions of the system are resident and executed on the client (e.g., customer side) and portions of the system are resident and executed on the server (e.g., service provider or network owner side). As shown, a client computer system 310 is connected to a server computer system 320 via a network 330. Depending on the association between the customer and the service provider or network owner, the network 330 may be any suitable network for connecting the client and server. For example, it may be a private network or the public Internet. The network 330 merely needs to provide a communications mechanism such that the components of the management system that are implemented on the client computer system 310 can communicate with the components of the management system that are implemented on the server computer system 320. Also, while a single computer system is illustrated in FIG. 3 for the client and a single computer system for the server, it is to be appreciated that either or both the client and server may have more than one computer system implementing the respective portions of the system. Also, with respect to FIG. 2, it is to be understood that the elements 110 and inter-domain networks 118 are not necessarily part of the server computer system, although functions associated with them may be, but rather are connected to the server system via the management modules 108 and 116 shown in FIG. 2.

Referring back to FIG. 3, the client computer system 310 comprises a processor 312 coupled to a memory 314 and I/O devices 316. Similarly, the server computer system 320 comprises a processor 322 coupled to a memory 324 and I/O devices 326. It is to be appreciated that the term "processor" as used herein is intended to include any processing device such as, for example, a CPU (central processing unit) or any other suitable processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for inputting data to the processing unit, and/or one or more output devices, e.g., CRT display with graphical user interface (GUI), printer, etc., for providing results associated with the processing unit. It is also to be understood that various components associated with a processor may be shared by other processors. Also, each computer system may have more than one processor. Accordingly, software components including instructions or code for performing the management methodologies of the invention, as described herein, may be stored in one or more of the associated memory devices (e.g., ROM, fixed or removable memory, etc.) and, when ready to be utilized, loaded in part or in whole (e.g., into RAM) and executed by a CPU.

Given such an exemplary hardware implementation, the operations of the network management system of the invention will now be explained in the context of the functional components illustrated in FIG. 2.

I. Business Management Module 102

A. Customer Service and Network Management Subsystem 120 (CS&NM)

Subscribers to the VPN service (i.e., end customers) have the option to monitor their service for fault and performance information. They are allowed to make certain changes to their VPN configuration without having to contact the service provider to do so. For example, a customer may be allowed to change the IP address pool associated with each VPN.

In accordance with the system, each customer needs to designate one or more "customer network managers" (CNMs) before they can utilize these features. This individual is the person who will interface with the automated management system 100 of the present invention. Information about the CNMs may be stored in a central database at the service provider. Each time a CNM tries to access the CS&NM functionality, the user will be authenticated against this central database.

The CS&NM features are developed as a set of client/server applications, i.e., for implementation in accordance with the arrangement shown in FIG. 3. The client software runs on a management system at the service subscriber's site (i.e., client computer system 310). The server software runs on the management system at the service provider's site (i.e., server computer system 320). The server software interfaces with the network and service management system for all the necessary data. It does not necessarily have to perform any data collection on its own. The server software may run on the same system as the network and service management system.

The rest of this section provides additional details on the fault, performance and configuration management features of the CS&NM component.

(i) Fault Management

The fault management subsystem allows the CNM to view all the current faults associated with any network element that is supporting their VPN. Specifically, customers are able to view faults associated with network elements and also are able to correlate faults to specific VPNs.

Referring now to FIG. 4, a flow diagram illustrating an example scenario 400 of the operation of the CS&NM fault management subsystem is shown. The operations proceed as follows. In step 402, the CNM starts the CS&NM fault management client software. In step 404, the client software requests CNM user identifier and password and authenticates the user. In step 406, the CS&NM client requests active faults from the CS&NM server. In step 408, the CS&NM server retrieves the list of VPNs and associated network elements relevant to the CNM. In step 410, for each of the network elements identified, the CS&NM server retrieves all the active faults from the fault database by interfacing with the fault management subsystem. In step 412, the CS&NM server sends the faults to the CS&NM client. Lastly, in step 414, the CS&NM client displays the faults to the CNM and allows the user to sort the faults by severity, network element, status, etc.

(ii) Performance Management

The performance management subsystem allows the CNM to view performance statistics on specific network elements. For example, the user is able to view the statistics for the network elements that are a part of the customer's VPN. The CS&NM component collects performance statistics on a daily, weekly and monthly basis. The CNM may view these pre-collected statistics. In addition, on-demand performance data collection may be implemented, if so desired.

The user is able to view performance statistics for specific network elements, as well as view the results of a correlation between performance data and specific VPNs. The system may also audit performance data against Service Level Agreements (SLAs) so that audit results may be shown to the user indicating whether the service is meeting the customer's SLA parameters. SLAs will be discussed in more detail below with respect to the customer care subsystem.

An example scenario of the performance management subsystem is very similar to the fault management scenario described above with respect to FIG. 4. The only difference is the type of data collected, i.e., performance data instead of faults.

(iii) Configuration Management

The configuration management subsystem, among other things, allows the CNM to change the IP address pool associated with a given VPN. The CNM is presented with a list of all the VPNs that are in service for the customer. The CNM selects one VPN at a time and makes configuration changes to it.

Referring now to FIGS. 5A and 5B, a flow diagram illustrating an example scenario 500 of the operation of the CS&NM configuration management subsystem is shown. The operations proceed as follows. In step 502, the CNM starts the CS&NM order management client software. In step 504, the client software asks for a CNM user identifier and password. In step 506, the client software establishes an SSL (Secure Socket Layer) connection to the CS&NM server on the service provider premises and authenticates the CNM. As is known, SSL is a commonly used secure protocol for web browsers to connect to secure web sites. In step 508, the CS&NM server retrieves the list of all the VPNs in service for the customer and presents it to the CNM. In step 510, the CNM selects the VPN to be re-configured. In step 512, the CS&NM server presents the user with all the VPN attributes and allows the CNM to add or delete IP address ranges from the VPN. In step 514, the CNM enters the required changes. In step 516, the CS&NM client sends the request to the CS&NM server. In step 518, the CS&NM component interfaces with the configuration provisioning manager (CPM) to execute the request and receive success/failure information from the CPM. In step 520, the CS&NM server propagates the information to the CS&NM client. Lastly, in step 522, the CS&NM client presents the information to the CNM.

B. Customer Care Management Subsystem 122 (CCM)

The customer care management component acts as a consolidation subsystem for the various service management features that the customer care team at the service provider will be able to access. CCM is a launching facility from which a customer care representative will be able to launch order management, billing management and trouble management subsystems. The system may include a customer management GUI that is used by a customer care representative to enter customer information, e.g., name, contacts, locations, and the VPN SLAs. An example of such GUI screens will be illustrated and explained later.

An SLA mainly specifies values to the attributes of a particular VPN link. An example of a VPN link is shown in FIG. 6. The VPN link is a virtual connection between two customer sites and creates the illusion that the hosts in the two sites are in the same private network. The VPN link is defined by specifying values for the following eight attributes: (1) Source address: packets from the specified source address only will flow through the VPN link; (2) Destination address: packets to the specified destination address only will flow through the VPN link; (3) Transport Protocol (i.e., TCP and UDP): packets with the specified transport level protocol only will flow through the VPN link; (4) Source/Destination Port: packets from/to the specified TCP port only will flow through the VPN link; (5) QoS: the VPN link will guarantee the specified QoS; (6) Bandwidth: the VPN link will guarantee the specified bandwidth; (7) Direction: packets in the VPN link will flow only in the specified direction (i.e., left to right, right to left or both directions); and (8) What Tunneling Protocol to use: for example, IP Secure which has encrypted packets, or just IP-IP which is not encrypted.

While a customer may sometimes call a customer care representative over the phone and provide certain service level information, the SLAs are typically negotiated and finalized by an account executive, and the agreements are then entered in bulk using the GUI associated with the customer care management system. Thus, the customer care representative uses such GUI to enter customer information and their VPN SLAs. The customer management subsystem first stores the service information in its database. Then, it invokes the order management subsystem to implement the service orders.

C. Network Operations Management Subsystem 124 (NOM)

The network operations management component acts as a consolidation subsystem for the various service management features the operations staff at the service provider are able to access. That is, NOM is a launching facility from which the operations management staff is able to launch trouble management, fault management and performance management features.

II. Service Management Module 104

A. Network Planning and Engineering Subsystem 126

Network Planning and Engineering is an activity outside the scope of this system. The system assumes that the core backbone has been engineered to handle all new VPN service orders. It is the responsibility of network planning and engineering to ensure that the backbone does have the capacity to handle new requests.

Accordingly, it is to be understood that the VPN configuration management system of the invention designs the VPN overlay on top of the existing network based on a customer's SLA needs and the equipment/topology of the network. The core network or the infrastructure network is designed and capacity/growth planning done by Network Planning and Engineering, prior to the VPN overlay.

Order management interfaces with this activity by generating a paper or electronic request to do network planning and engineering. If the network does not have the capacity to handle the new request, the order will have to be manually rejected.

B. Order Management Subsystem 128

The Order Management (OM) component provides a web-based graphical user interface (GUI) that allows the customer service representative (CSR) to create, modify, or delete a service order (SO). An example of such GUI screens will be illustrated and explained later. The OM component also tracks the status of an SO as it proceeds through the different stages of completion. It allows the CSR to manually update the status, if desired. It also allows the CSR to create, modify, or delete information about a customer. The OM component interfaces with the Network Planning & Engineering (NP&E) subsystem 126, the Configuration Provisioning Management (CPM) subsystem 138, and the Billing Management subsystem 130 to complete the service request.

Further, the OM subsystem decomposes the service orders received from the customer care management subsystem into tasks such as design, configuration and testing. The OM also invokes the configuration provisioning management (CPM) subsystem in the network management module to implement the tasks. The OM server stores the states of the service orders and the associated tasks, and drives the activities of the CPM. The OM server also employs the OM GUI to request a provisioning agent, if necessary, to install one or more access lines between equipment or to perform external tests of the newly implemented VPN. A provisioning agent may be an individual employed by the service or network provider. That is, when the management system 100 of the invention designs a VPN link, sometimes it may not be able to find sufficient bandwidth in the currently installed access lines. In such cases the system informs a provisioning agent to install a specific type of access lines between the ports of network elements. The provisioning agent can then take appropriate actions to provision the lines. When the lines are provisioned, the agent may inform the system through the OM GUI. The system then proceeds to complete the design using the newly provisioned access lines. Note that if there was enough bandwidth in the existing access lines, the system would automatically design the VPN without manual intervention.

After successfully designing and configuring the VPN, the system next proceeds to test the connectivity between customer sites through the newly designed VPN. If the connectivity test succeeds, the system informs the provisioning agent to perform external tests to check other aspects of the service level agreements such as bandwidth, QoS, etc. When the provisioning agent informs the system of the success of the external test, the system activates the VPN.

Referring now to FIG. 7, a flow diagram illustrating an example scenario 700 of the operation of the OM subsystem is shown. The operations proceed as follows. In step 702, a customer calls the CSR with a request for a new service, modification of a service, or termination of a service. In step 704, the CSR, using the OM GUI, creates a new service order with the service request. In step 706, the OM creates the customer account information and stores it in the customer database. In step 708, the OM sends a message to the billing management subsystem to create a customer billing account. In step 710, the OM sends a configure and provision request to Configuration Provisioning Management (CPM) subsystem with the data needed to complete the service request, which could be to add a new service, modify an existing service, or terminate a service. In step 712, the CPM completes the service order by interfacing with other appropriate subsystems and sends a message back to OM. In step 714, after the OM receives the order completion message from CPM, it enables the account's billing. Lastly, in step 716, the OM then sends a notification to the customer with the service activation information and billing information.

The following subsections describe the system interfaces that the Order Management component supports.

(i) Network Planning and Engineering System Interface

OM may need to interface with the NP&E subsystem if it is discovered during the provisioning process that there is a need to modify the network infrastructure due to insufficient bandwidth, delay being too high, new links needing to be created, etc. This interface may be manually activated (e.g., the CSR may send a network modification request to the NP&E group via e-mail). Alternatively, the request may be automated, when the NP&E has provisions for such an interface.

(ii) Billing Management Interface

The CSR collects all the data needed to complete the service order per an OM user interface form. Part of the data that is collected is the billing information. Also, once the service has been provisioned and activated, OM sends a request to the Billing Management subsystem to activate billing.

(iii) Configuration Provisioning Management Interface

OM sends the actual configuration and provisioning requests to CPM, which in turn converts those requests to individual requests for the appropriate elements that need to be reconfigured or provisioned.

C. Billing Management Subsystem 130

The system 100 provides interfaces to the Billing Management subsystem. It is to be appreciated that the Billing Management subsystem, itself, is outside the scope of the invention.

D. Trouble Management Subsystem 132

The Trouble Management (TM) component provides a web-based graphical user interface (GUI) that allows the CSR to create, modify, or delete a trouble ticket (TT). The TM component also tracks the status of a TT as it proceeds through the different stages of completion. It also allows the CSR to manually update the status, if desired. The TM component interfaces with the Billing Management subsystem and the Fault Management (FM) component.

Figure 8:
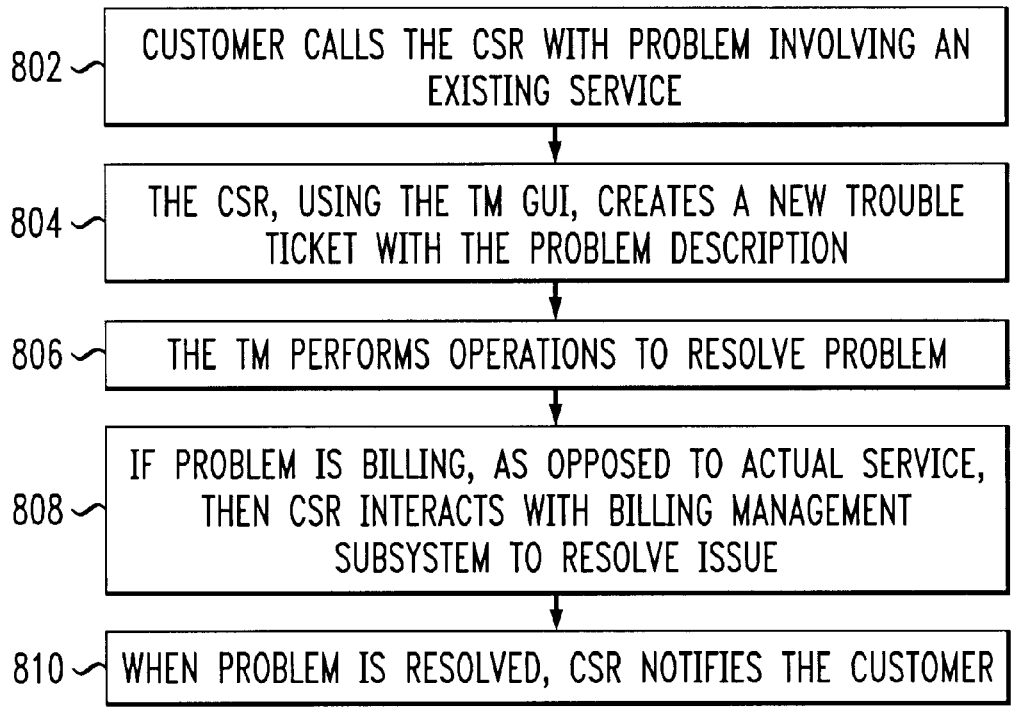
FIG. 8 is a flow diagram illustrating an example scenario of the operation of a trouble management subsystem according to an embodiment of the present invention.

Referring now to FIG. 8, a flow diagram illustrating an example scenario 800 of the operation of the TM subsystem is shown. The operations proceed as follows. In step 802, a customer calls the CSR with a problem involving an existing service. In step 804, the CSR, using the TM GUI, creates a new trouble ticket (TT) with the problem description. In step 806, the TM performs operations to resolve the problem. It is to be appreciated that the TM process may be manual or automated. If it is manual, then an operations person is responsible for getting the problem resolved and moving the trouble ticket status as it progresses through various stages of completion. If it is automated, then the TM subsystem interfaces with the other subsystems and sends appropriate requests to them, for example, to test or reconfigure the elements or subnetworks. In step 808, if the problem is with billing, as opposed to the actual service, then the CSR interacts with the Billing Management subsystem to resolve the issue. Lastly, in step 810, when the problem is resolved, the CSR notifies the customer.

The following subsections describe the system interfaces that the Trouble Management component supports.

(i) Billing Management Interface

The TM may need to interact with the Billing Management subsystem to resolve any customer billing issues. This interface may be manual or automated.

(ii) Fault Management Interface

The TM may need to interact with the Fault Management subsystem to check for and correlate network and equipment faults to the problems faced by the customer. This interface may be manual or automated.

E. Service Level Performance Management Subsystem 134

The network level performance management subsystem correlates network element performance data into performance statistics for each VPN. Service level performance management uses the network level performance management data and audits it against Service Level Agreement (SLA) performance requirements.

A primary purpose of this component is to provide the network operations staff with information on whether each VPN is meeting the SLA or not.

III. Network Management Module 106 A. Network Database Management Subsystem 136

The network database management (NDM) component maintains a database of all the IP network resources that participate in VPNs. These include all the network elements and the access ports associated with them. The database also maintains the network connectivity/topology information. In addition, NDM also maintains a database of all the VPNs and their attributes. VPN attributes include which devices and ports form the VPN, what is the IP address pool, the class of service associated with the VPN, tunnel type, etc. Additionally, NDM maintains links in a customer database to associate the VPNs with specific customers.

Thus, the NDM keeps track of the topology and equipment information in its database. It provides this information, in appropriate form, to the Configuration Provisioning Management subsystem when the latter is designing or configuring a VPN. An NDM GUI is provided so that operators or staff can add, delete or modify equipment and equipment information. An example of such GUI screens will be illustrated and explained below.

When the system is first deployed, NDM conducts an auto-discovery of the network and populates the network database with all the IP devices available for VPN service. In this initial discovery stage, all equipment with IP addresses that can be reached using information in a given seed-file will be discovered and the database will be initialized with the discovered information. This occurs at the initialization time of the system 100 or when a network database of the system needs to be initialized. After the initialization stage, the system can request all topology changes since the initialization (or last update) and update its databases.

B. Configuration Provisioning Management Subsystem 138

The Configuration Provisioning Management (CPM) component takes the service provisioning and configuration requests generated by service orders and break them down into configuration or provisioning requests for the management subsystems of the network elements and the backbone or core network. Examples of individual element management systems are: PortMaster4 (router), RS4000 (remote access server), and LMF (all products of Lucent Technologies, Inc. of New Jersey). Examples of backbone or core networks are: ATM, SONET, and Frame Relay.

Also, the CPM component is responsible for designing the VPN, generating device-independent configuration and testing commands, sending them to element management interface modules and informing the status of its activities to the OM subsystem. The VPN design information is stored in a CPM database and is used to modify or delete the VPN in the future, if necessary.

Referring now to FIG. 9, a flow diagram illustrating an example scenario 900 of the operation of the Configuration Provisioning Management (CPM) subsystem is shown. The operations proceed as follows. In step 902, the CPM receives a high-level configure/provision request from OM. In step 904, which may be considered as the VPN design step, the CPM then communicates with the Network Data Manager (NDM) to determine the point where the customer site connects to the ISP's network and the associated equipment that will need to be configured or provisioned to provide the desired service. For example, in the case of a VPN service, the CPM communicates with the NDM to determine the following for both ends of the VPN: (1) the closest Remote Access Server (RAS) that is available for the VPN from a customer's site; (2) the router associated with it; and (3) where the router would connect to the ATM/SONET backbone network. It is to be appreciated that steps 906, 908 and 910 may be considered as the provisioning and/or configuring steps. In step 906, the CPM then breaks the high-level request to configure or provision into requests for the individual elements and subnetworks. For example, the VPN request discussed in the previous example would be separated into requests for the RAS, Router, and the ATM/SONET backbone. In step 908, the CPM then sends these requests to the elements or subnetworks via the respective interface modules. In step 910, the CPM waits for the successful completion of the requests sent to the element interface modules. Lastly, in step 912, the CPM sends a completion reply back to OM when the entire service is configured.

The following subsections describe the system interfaces that the Configuration Provisioning Management component supports.

(i) Order Management Interface

CPM has a "northbound" interface with OM from which it receives requests and data needed to configure and provision the network elements and subnetworks. By "northbound," it is meant that the interface is upward in the context of how the system is shown in FIG. 2. That is, the system is illustrated in a layered top to bottom format, e.g., business, service, network and element. After successful completion of the request, CPM sends a reply back to OM.

(ii) Network Database Management Interface

The CPM interacts with the NDM to determine which network elements and subnetworks need to fulfill the customer service request.

C. Element Interface Modules 144, 146 and 148

In order to execute the configuration changes on individual network elements, CPM interfaces with the Element Management Systems (EMS) for those elements. However, instead of directly interfacing with the EMSs, CPM has a set of interface modules that abstract the EMS interfaces. These modules accept a generic configuration change request from CPM and translate it into the specific command and syntax accepted by the EMS. For instance, there may be specific interface modules implemented for the RS4000 and PortMaster4 devices.

The Element Management Interface system, which as shown in FIG. 2 comprises the interfaces 144, 146 and 148, periodically gets equipment updates from the network which helps keep the Network Data Management database current. The Element Management Interface is also responsible for translating the generic device-independent commands from the CPM subsystem to device specific commands (e.g., the command to set up a tunnel or a filter on a specific device such as PortMaster4) and sending them to the network elements through appropriate interfaces, e.g., CLI (Command Line Interface), CORBA™ (Common Object Request Broker Architecture) or SNMP (Simple Network Management Protocol). It also gets the status of the commands from the network elements or EMSs, and informs the CPM subsystem. The Element Management Interface system also periodically polls the EMSs to find out the list of network elements under the control of each EMS.

D. Network Level Fault Management Subsystem 140

Network level fault management correlates faults originating from the various network elements into network level faults. This module has the responsibility to determine which VPNs are affected by the incoming network element faults.

The extent to which this subsystem performs fault correlation is dependent on the granularity of the faults coming from the network elements. If the elements provide faults at a port level, the product accurately correlates the faults to specific VPNs.

E. Network Level Performance Management Subsystem 142

Network level performance management collects performance data for the various network elements from their associated element management systems and correlates that information into VPN level performance statistics. A primary focus of this subsystem is to provide end-to-end performance data for each VPN.

IV. Illustrative System GUI Screens

Referring now to FIGs. 10A through 10E, exemplary screens associated with certain of the graphical user interfaces of system 100, as mentioned above, are shown. Some of the features of these screens will now be described. It is to be appreciated that these and other screens may be presented to the user on one or more CRTs associated with the system.

Figure 10A:
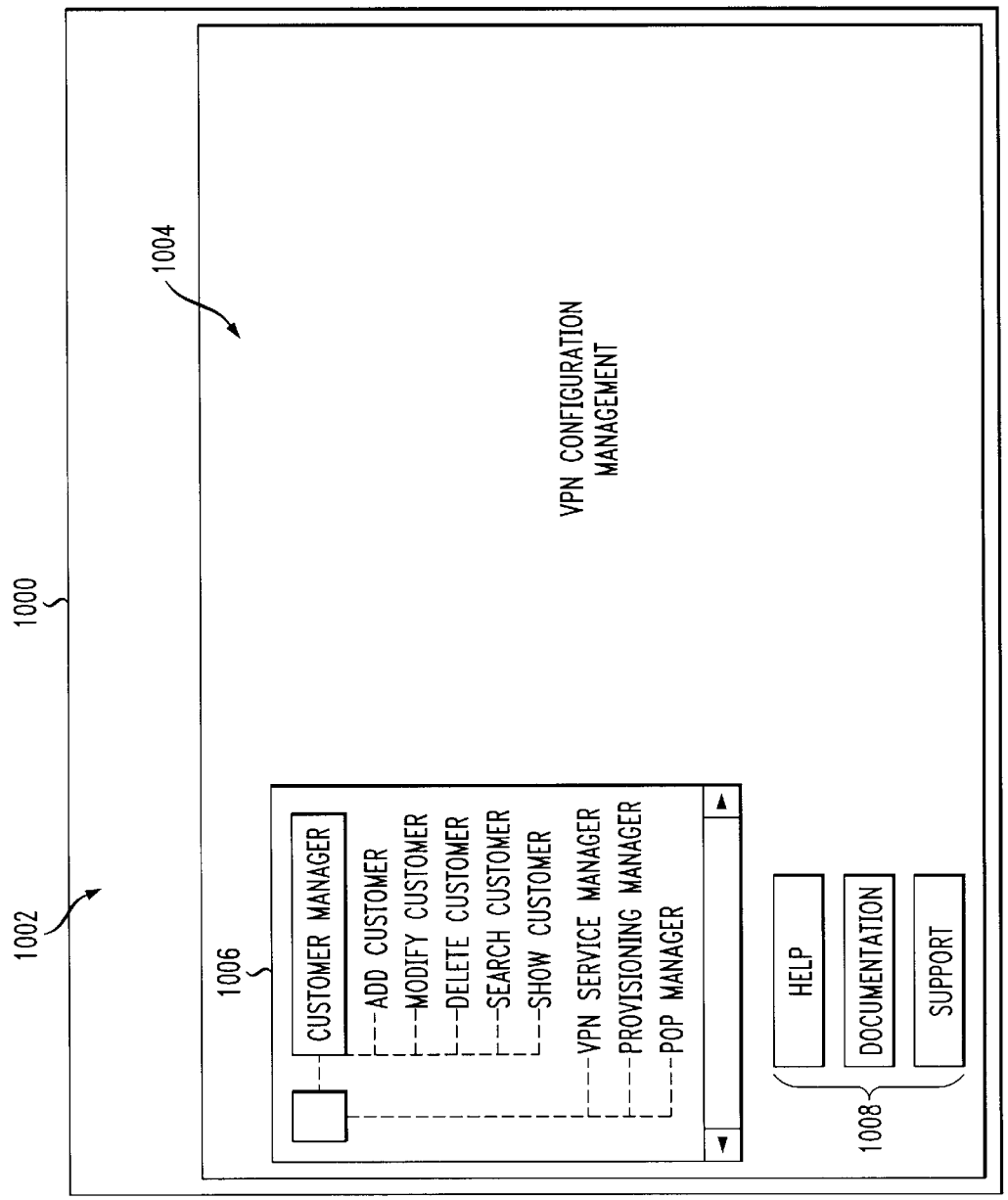
FIGS. 10A through 10E are diagrams illustrating graphical user interface screens associated with an IP VPN management system according to an embodiment of the present invention.
Figure 10B:
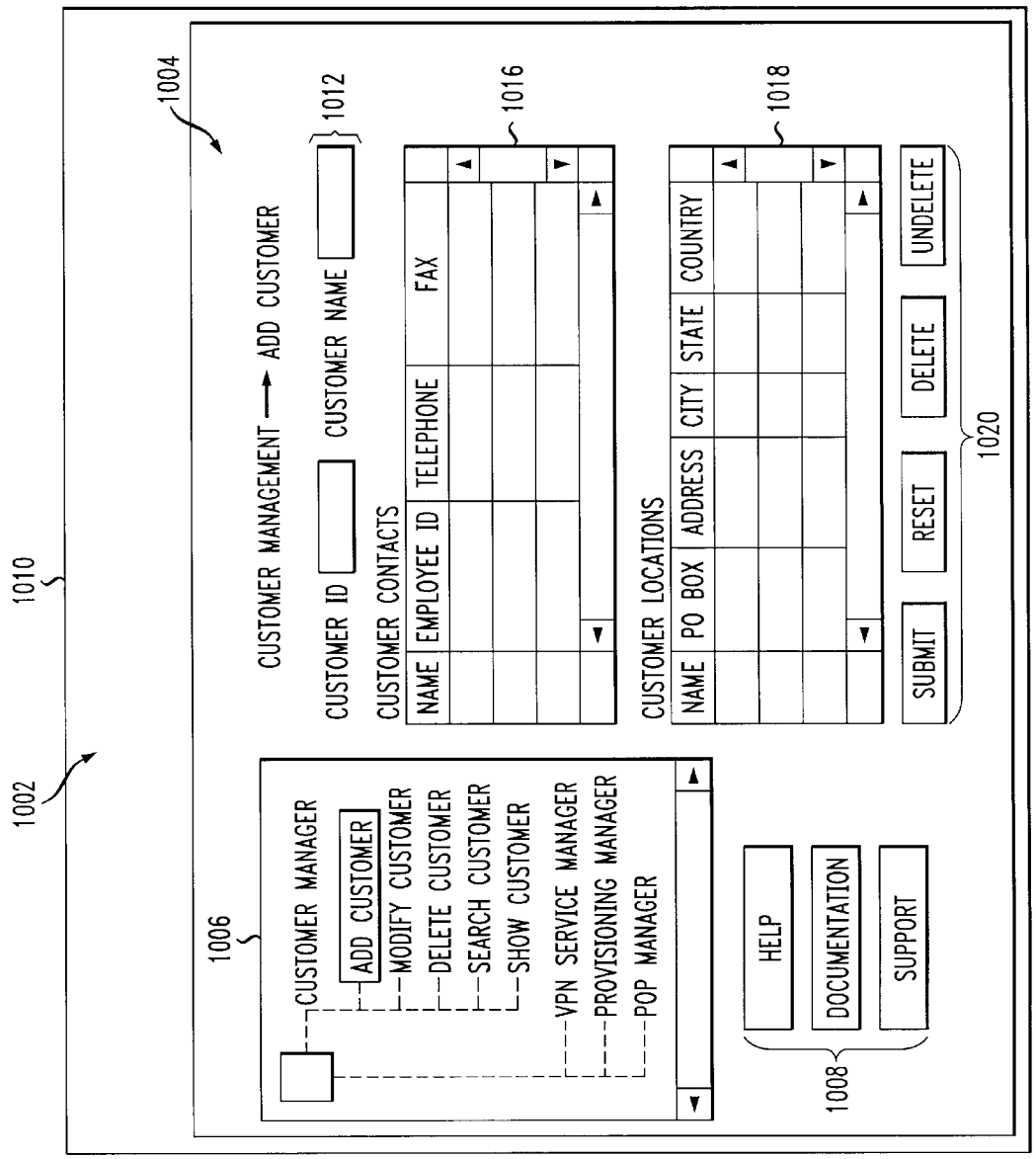

Particularly, FIGS. 10A and 10B illustrate sample screens associated with the customer management GUI. Referring initially to FIG. 10A, screen 1000 comprises a browser-specific information and control area 1002 and a management system information and control area 1004. It is to be understood that the area 1002, which may include menus, entry fields, etc, is dependent on the particular browser software (e.g., Netscape™, Internet Explorer™, etc.) that the user is employing to access the system and, thus, is not shown in detail. The management system interface is contained in area 1004. Area 1004 includes a subsystem/function selection area 1006 where the user may highlight the subsystem or function he desires and select it (e.g., using a mouse or keyboard). Various control buttons 1008 may be clicked on to select other features and functions associated with the system, e.g., help, documentation, and support features. FIG. 10B illustrates a customer management screen 1010 that is used to add a customer. In the area 1004 are data entry fields 1012 for customer identification (ID) and customer name information, data entry fields 1016 for customer contact information (e.g., name, employee ID, telephone, fax, etc.), and data entry fields for customer locations (e.g., name, P.O. box, address, city, state, country, etc.). Also, area 1004 includes buttons 1020 for submitting, resetting, deleting and undeleting data entered in the fields.

Figure 10C:
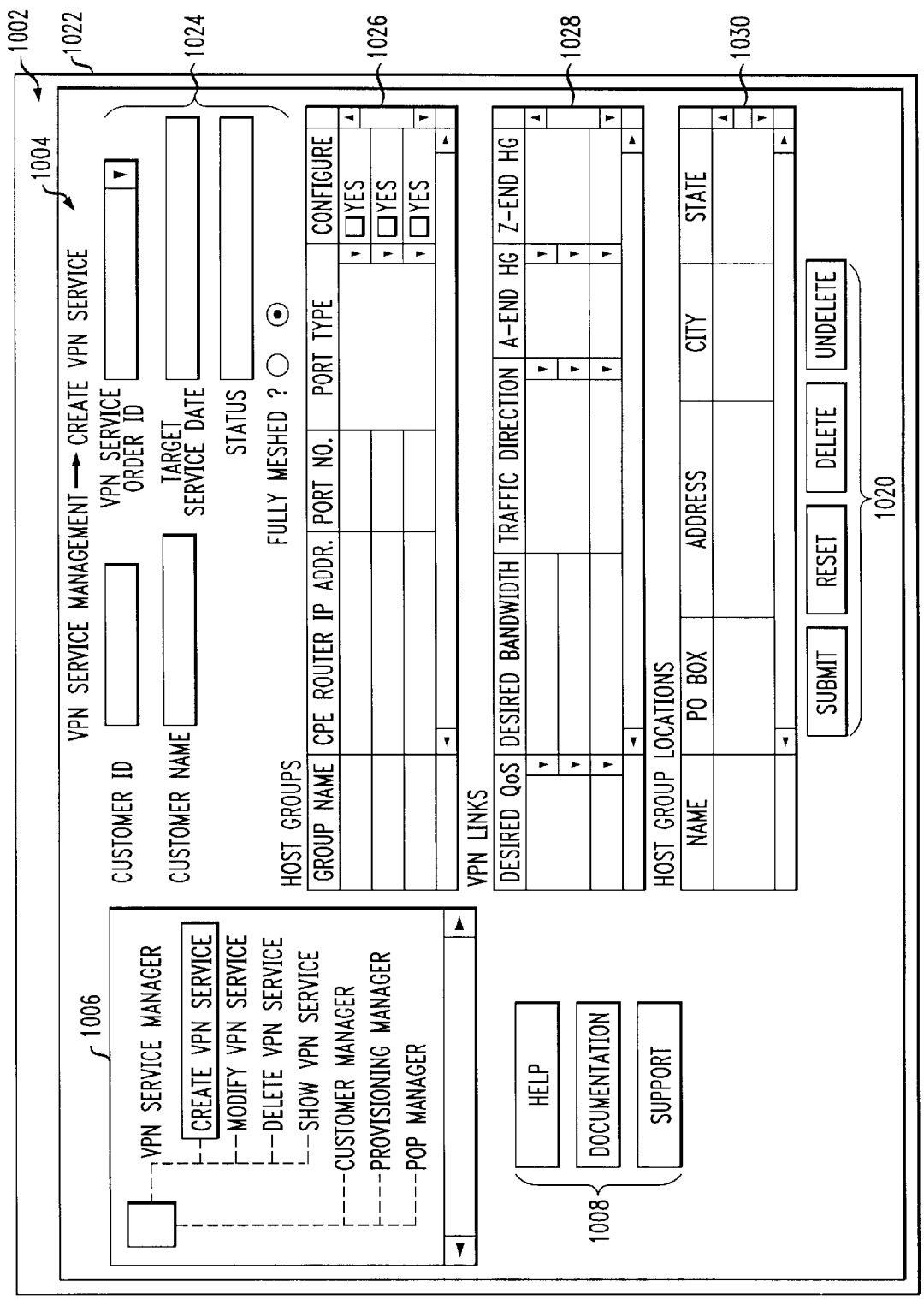

Referring now to FIG. 10C, a sample screen 1022 associated with a configuration management GUI is shown. Particularly, screen 1022 may be used to create a VPN service. The screen may include data entry fields 1024 for customer ID, customer name, a VPN service order ID, a target service date, status, and an indication whether the service is fully meshed or not. In addition, area 1004 includes fields 1026 for host group information (e.g., group name, customer premise equipment router IP address, port no., port type, and indication whether the group is configured, etc.), fields 1028 for VPN link information (e.g., desired QoS, desired bandwidth, traffic direction, and tunnel end identification: A-end and Z-end, etc.), and fields 1030 for host group locations (e.g., name, P.O. box, address, city, state, etc.).

Figure 10D:
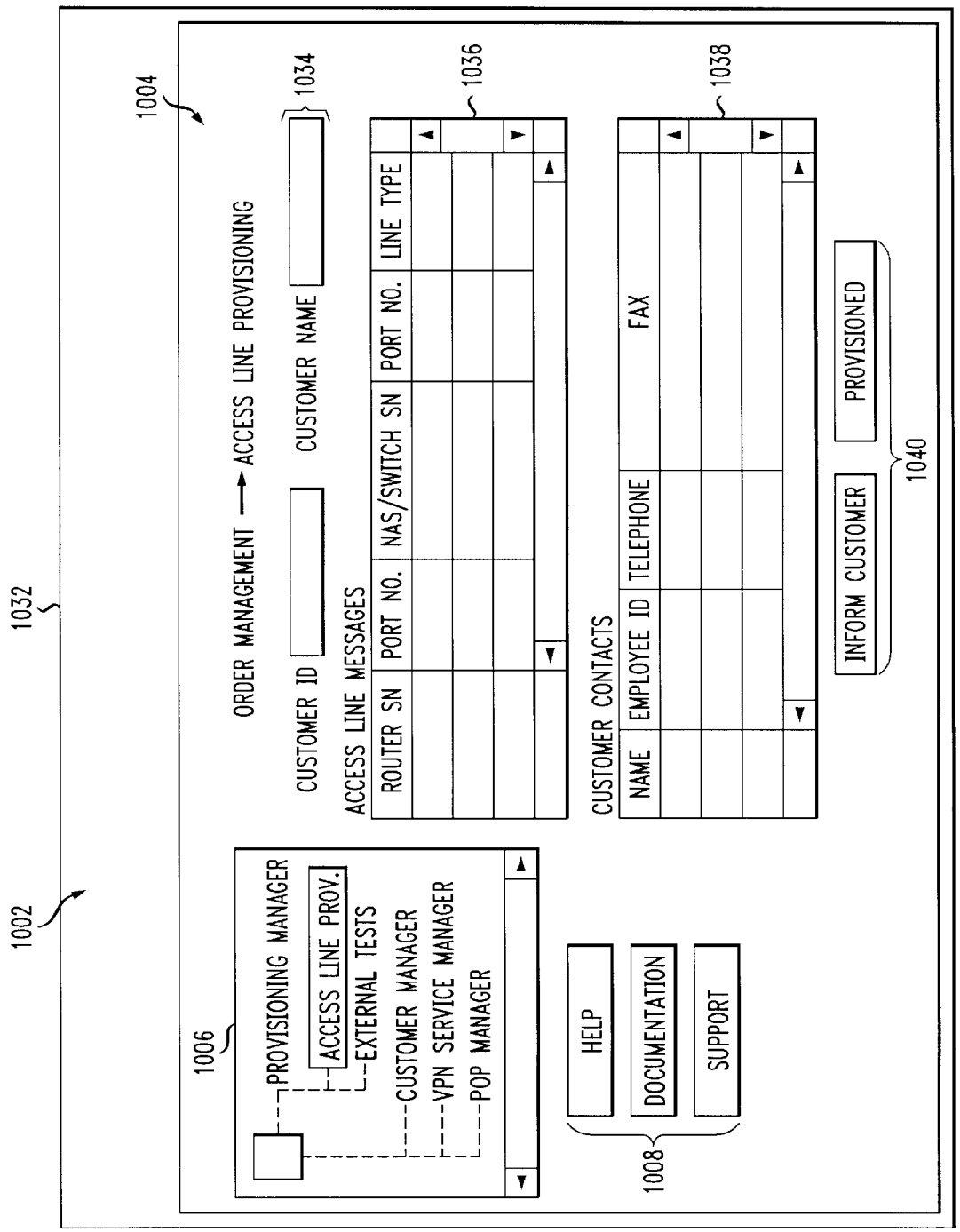

Referring now to FIG. 10D, a sample screen 1032 associated with a order management GUI is shown. Particularly, screen 1032 may be used to provision an access line needed in the VPN. The screen may include data entry fields 1034 for customer ID and customer name, fields 1036 for access line messages (e.g., router serial no. and port no., network access server/switch serial no. and port no., line type, etc.), and fields 1038 for customer contact information (e.g., name, employee ID, telephone, fax, etc.). The area 1004 may also include buttons 1040 to handle "inform customer" and "provisioned" functions. The "inform customer" button on the provisioning screen is used by the provisioning agent to let the system know that the customer was informed regarding setup of an access line (e.g., a T1 line) from the customer site to the point of presence (POP). The "provisioned" button on the provisioning screen is used by the provisioning agent to let the system know that the customer was informed by the provisioning agent that the provisioning of the access line from the customer site to the POP has been successfully completed.

Figure 10E:
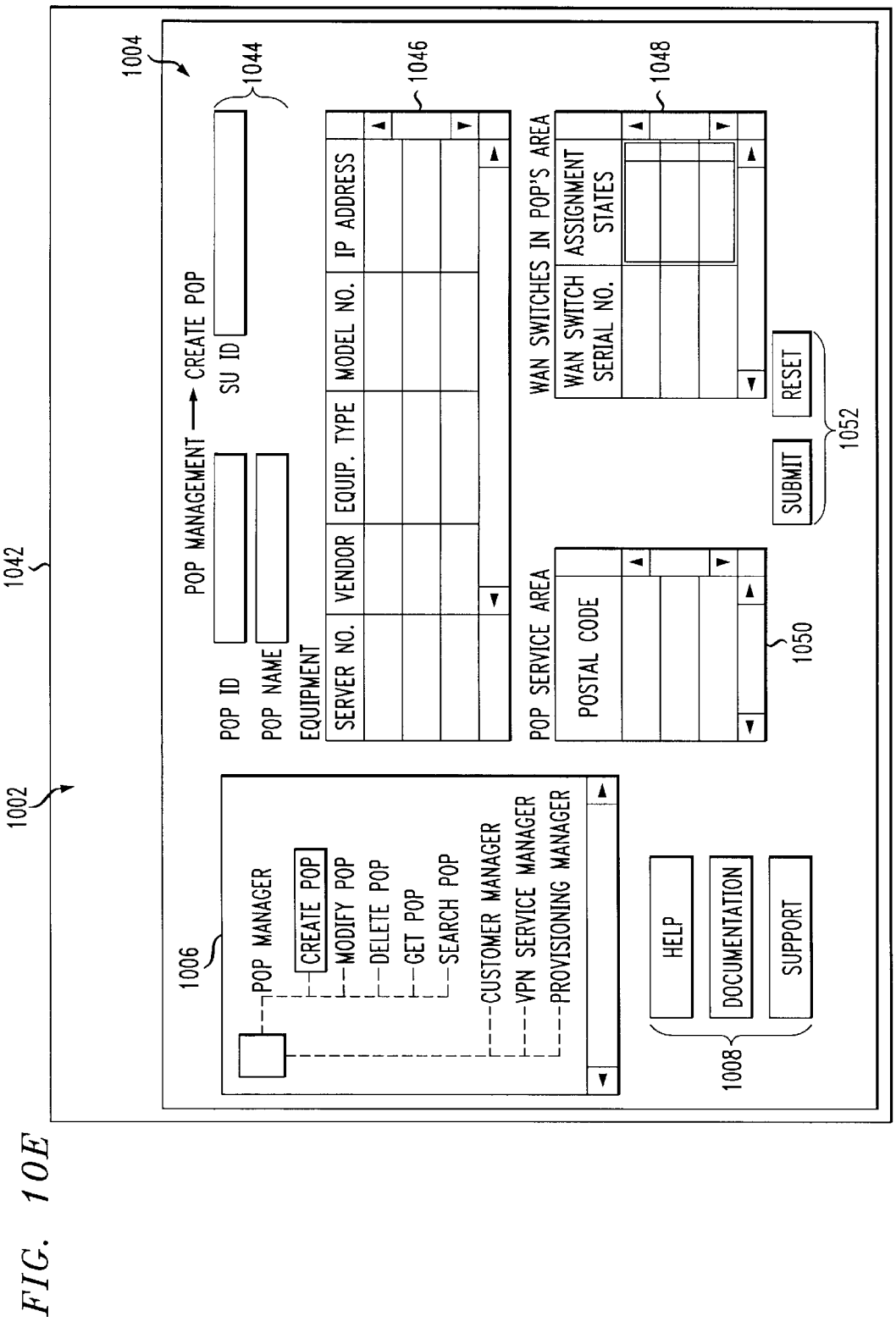

Referring now to FIG. 10E, a sample screen 1042 associated with a network database management GUI is shown. Particularly, screen 1042 may be used to create a point of presence (POP) in the VPN. The screen may include data entry fields 1044 for POP ID, POP name and SU ID (a Service Unit or SU is a combination of one or more remote access servers on a local area network with a POP router, e.g., a PacketStar 6400), fields 1046 for equipment information (e.g., serial no., vendor, equipment type, model no., IP address, etc.), fields 1048 for information relating to wide area network (WAN) switches in the POP's area (e.g., WAN switch serial no. and switch assignment states, etc.), and field 1050 for POP service area information (e.g., postal code, etc.). The area 1004 may also include buttons 1053 to submit and reset the information on the screen.

It is to be appreciated that the above-described GUI screens are merely exemplary in nature and that the system may include other screens used to perform portions of the various methodologies described herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An automated system for managing a virtual private network, comprising:

one or more processing devices operative to: (i) generate a service order based on a request from a user for at least one of a new service, a modification of an existing service and a termination of an existing service associated with the virtual private network; (ii) cause a determination of design requirements associated with implementing the user's request; (iii) cause provisioning of one or more virtual private network elements, when necessary, to implement the design requirements; (iv) cause the virtual private network to be configured to satisfy one or more conditions associated with the user's request; and (v) cause at least a portion of the virtual private network to be tested to determine whether the user's request has been satisfied; and a memory, coupled to the one or more processing devices, which stores at least a portion of data associated with the generating, design, provisioning, configuration and testing operations.

2. The automated system of claim 1, wherein at least one of the processing devices is a client device and at least one processing device is a server, the client device and the server being coupled via a communications network.

3. The automated system of claim 2, wherein the client device is resident at a location associated with the user and the server is resident at a location associated with a provider of the virtual private network.

4. The automated system of claim 1, wherein the virtual private network is an Internet Protocol based virtual private system.

5. The automated system of claim 1, wherein the one or more processing devices are further operative to at least one of track and report configuration information associated with the virtual private network to the user.

6. The automated system of claim 1, wherein the one or more processing devices are further operative to at least one of track and report fault information associated with the virtual private network to the user.

7. The automated system of claim 1, wherein the one or more processing devices are further operative to at least one of track and report performance information associated with the virtual private network to the user.

8. The automated system of claim 1, wherein the at least one or more processing devices are further operative to provide a graphical user interface for permitting the user to enter the service request.

9. The automated system of claim 8, wherein the at least one or more processing devices are further operative to generate the service order in response to the entry of the request by the user at the graphical user interface.

10. The automated system of claim 1, wherein the one or more processing devices are further operative to present the user with one or more attributes associated with the virtual private network.

11. The automated system of claim 10, wherein the one or more attributes comprise at least one of: (i) source address information; (ii) destination address information; (iii) transport protocol information; (iv) source/destination port information; (v) quality of service information; (vi) bandwidth information; (vii) data flow direction information; and (viii) tunneling protocol information.

12. The automated system of claim 1, wherein the one or more processing devices are further operative to authenticate the user's identity.

13. The automated system of claim 1, wherein the one or more processing devices are further operative to interface with the one or more virtual private network elements with respect to at least one of the provisioning, configuration and testing operations.

14. The automated system of claim 1, wherein the one or more processing devices are further operative to interface with one or more other networks associated with the virtual private network with respect to at least one of the provisioning, configuration and testing operations.

15. An automated system for managing a virtual private network, comprising one or more processing devices operative to form:

an order management subsystem for generating a service order based on a request from a user for at least one of a new service, a modification of an existing service and a termination of an existing service associated with the virtual private network;

a configuration management subsystem, coupled to the order management subsystem, for: (i) causing a determination of design requirements associated with implementing the user's request; (ii) causing provisioning of one or more virtual private network elements, when necessary, to implement the design requirements; (iii) causing the virtual private network to be configured to satisfy one or more conditions associated with the user's request; and (iv) causing at least a portion of the virtual private network to be tested to determine whether the user's request has been satisfied; and an interface subsystem, coupled to the configuration management subsystem, for providing one or more interfaces to the configuration management subsystem in order to communicate with at least one of the one or more virtual private network elements and other networks, with respect to at least one of the provisioning, configuration and testing operations.

16. The automated system of claim 15, wherein at least one of the processing devices is a client device and at least one processing device is a server, the client device and the server being coupled via a communications network.

17. The automated system of claim 16, wherein the client device is resident at a location associated with the user and the server is resident at a location associated with a provider of the virtual private network.

18. The automated system of claim 15, wherein the virtual private network is an Internet Protocol based virtual private system.

19. The automated system of claim 15, wherein the one or more processing devices are further operative to at least one of track and report configuration information associated with the virtual private network to the user.

20. The automated system of claim 15, wherein the one or more processing devices are further operative to at least one of track and report fault information associated with the virtual private network to the user.

21. The automated system of claim 15, wherein the one or more processing devices are further operative to at least one of track and report performance information associated with the virtual private network to the user.

22. The automated system of claim 15, wherein the at least one or more processing devices are further operative to provide a graphical user interface for permitting the user to enter the service request.

23. The automated system of claim 22, wherein the at least one or more processing devices are further operative to generate the service order in response to the entry of the request by the user at the graphical user interface.

24. The automated system of claim 15, wherein the one or more processing devices are further operative to present the user with one or more attributes associated with the virtual private network.

25. The automated system of claim 24, wherein the one or more attributes comprise at least one of: (i) source address information; (ii) destination address information; (iii) transport protocol information; (iv) source/destination port information; (v) quality of service information; (vi) bandwidth information; (vii) data flow direction information; and (viii) tunneling protocol information.

26. The automated system of claim 15, wherein the one or more processing devices are further operative to authenticate the user's identity.

27. An article of manufacture for managing a virtual private network, comprising a machine readable medium containing one or more programs which when executed implement the steps of:

> automatically generating a service order based on a request from a user for at least one of a new service, a modification of an existing service and a termination of an existing service associated with the virtual private network;
>
> automatically causing a determination of design requirements associated with implementing the user's request;
>
> automatically causing provisioning of one or more virtual private network elements, when necessary, to implement the design requirements;
>
> automatically causing the virtual private network to be configured to satisfy one or more conditions associated with the user's request; and
>
> automatically causing at least a portion of the virtual private network to be tested to determine whether the user's request has been satisfied.

28. A computer-implemented method of managing a virtual private network, comprising the steps of:

> automatically generating a service order based on a request from a user for at least one of a new service, a modification of an existing service and a termination of an existing service associated with the virtual private network;
>
> automatically causing a determination of design requirements associated with implementing the user's request;
>
> automatically causing provisioning of one or more virtual private network elements, when necessary, to implement the design requirements;
>
> automatically causing the virtual private network to be configured to satisfy one or more conditions associated with the user's request; and
>
> automatically causing at least a portion of the virtual private network to be tested to determine whether the user's request has been satisfied.

* * * * *